US011669898B2

(12) United States Patent
Hoger von Hogersthal et al.

(10) Patent No.: US 11,669,898 B2
(45) Date of Patent: Jun. 6, 2023

(54) SYSTEM FOR ESTIMATING DISTANCE-TO-DEFAULT CREDIT RISK

(71) Applicant: S&P Global Inc., New York, NY (US)

(72) Inventors: Giorgio Baldassarri Hoger von Hogersthal, London (GB); Kam To Lui, London (GB)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 17/202,980

(22) Filed: Mar. 16, 2021

(65) Prior Publication Data

US 2022/0301048 A1    Sep. 22, 2022

(51) Int. Cl.
*G06Q 40/00*    (2023.01)
*G06Q 40/03*    (2023.01)
*G06N 20/00*    (2019.01)

(52) U.S. Cl.
CPC ............. *G06Q 40/03* (2023.01); *G06N 20/00* (2019.01); *G06Q 40/00* (2013.01)

(58) Field of Classification Search
CPC ....... G06Q 40/00; G06Q 40/025; G06N 20/00
USPC ................................................. 705/4, 35–45
See application file for complete search history.

(56) References Cited

U.S. PATENT DOCUMENTS

| | | | | |
|---|---|---|---|---|
| 2012/0290505 A1* | 11/2012 | Eder | ...................... | G06Q 10/06 705/36 R |
| 2013/0132163 A1* | 5/2013 | Eder | ...................... | G06Q 40/03 705/7.37 |
| 2016/0239919 A1* | 8/2016 | Eder | ...................... | G06N 20/00 |
| 2018/0276750 A1* | 9/2018 | Laskin | ................... | G06Q 40/04 |

FOREIGN PATENT DOCUMENTS

| | | | | |
|---|---|---|---|---|
| CN | 111507831 A | * | 8/2020 | ........... G06Q 40/025 |
| KR | 20120134849 A | * | 12/2012 | ............. G06Q 40/02 |

OTHER PUBLICATIONS

"Starmine Structural Credit Risk Model Overview and Global Performance" Erickson etal. Written Jun. 2012. Refinitiv. p. 3.*
Merton, "On the Pricing of Corporate Debt: The Risk Structure of Interest Rates," The Journal of Finance, May 1974, pp. 449-470, vol. 29, No. 2, doi:10.2307/2978814.
Black et al., "The Pricing of Options and Corporate Liabilities," Journal of Political Economy, May-Jun. 1973, pp. 637-654, vol. 81, No. 3, doi: 10.1086/260062.
Liu et al., "A Neural Network-Based Framework for Financial Model Calibration," Journal of Mathematics in Industry, 2019, pp. 1-28, vol. 9, doi: 10.1186/s13362-019-0066-7.

* cited by examiner

*Primary Examiner* — Jessica Lemieux
*Assistant Examiner* — Mohammed H Mustafa
(74) *Attorney, Agent, or Firm* — Yee & Associates, P.C.

(57) ABSTRACT

A method, computer system, and computer program product are provided for assessing a credit risk of a set of companies. A computer system creates a training data set from distance-to-default values for a first set of companies. The computer system builds a set of predictive models based on the training data set, linking the observed distance-to-default to market capitalization and total liabilities. The computer system forecasts estimated new distance-to-default values for a second set of companies, based on their current distance-to-default (obtained from the Merton approach), and a future change in market capitalization and/or change in total liabilities, according to the set of predictive models.

18 Claims, 12 Drawing Sheets

SYSTEM FOR ESTIMATING DISTANCE-TO-DEFAULT CREDIT RISK

BACKGROUND INFORMATION

1. Field

The present disclosure relates generally to an improved system and method, which can be embodied in an apparatus, computer system, or computer program product, for assessing a credit risk for a set of companies.

2. Background

Economist Robert C. Merton proposed a model for assessing the structural credit risk of a company by modeling the company's equity as a call option on its assets. Analysts and investors utilize the Merton model to understand how capable a company is at meeting financial obligations, servicing its debt, and weighing the possibility that it will go into credit default.

The distance-to-default is a measure of credit risk that is based on Merton's model. Among market practitioners, it is widely agreed that the distance-to-default is a useful measure for assessing the credit risk of a nonfinancial corporation. since the firm defaults when its asset value falls below the face value of its debt, the strike price or default barrier is equal to the value of the liabilities. The concept of a distance measure of risk follows simply that the higher the value of the firm assets, $V_A$, relative to the strike price or default barrier, D, the farther away from default the firm is.

Calculation of a publicly listed company's distance-to-default via the Merton approach requires a time series of daily stock returns and the iterative solution of two unknowns in a nonlinear system of equations. The calculation of a company's distance-to-default via the Merton approach is both time-consuming and computationally intensive. The computation becomes particularly time consuming when one needs to calculate how the current distance-to-default for each company within a big portfolio of thousands of firms changes due a change in each firm's market capitalization or total liabilities.

Various attempts have been made to speed up the estimation of public firms' Merton's distance-to-default under various scenarios. For example, Chen proposed a numerical approximation for estimating the change of a firm's distance-to-default due to a change of the underlying market capitalization or total liabilities by leveraging the partial derivations of asset value and asset volatility, which have a closed-form expression, with respect to the underlying market capitalization or total liabilities. Chen's estimated change in distance-to-default can be computed from the estimated change in asset value and asset volatility as indicated by the partial derivatives and the change in the underlying factors. However, this approximation approach works well only locally, for a small change in the underlying factors.

Therefore, it would be desirable to have a method and apparatus that take into account at least some of the issues discussed above, as well as other possible issues. For example, it would be desirable to have a method and apparatus that overcome a technical problem with determining company's distance-to-default that is more time-consuming and computationally intensive than desired.

SUMMARY

An embodiment of the present disclosure provides a credit evaluation system comprising a computer system and a risk estimator in the computer system. The risk estimator operates to create a training data set from distance-to-default values for a first set of companies; to build a set of predictive models based on the training data set; and to forecast an estimated change in distance-to-default values for a second set of companies according to the set of predictive models.

Another embodiment of the present disclosure provides a method for assessing a credit risk of a set of companies. A computer system creates a training data set from distance-to-default values for a first set of companies. The computer system builds a set of predictive models based on the training data set. The computer system forecasts an estimated change in distance-to-default values for a second set of companies according to the set of predictive models.

Still another embodiment of the present disclosure provides a computer program product for assessing a credit risk for a set of companies, the computer program product comprising a computer readable storage media with program code stored on the computer-readable storage media. The program code includes code for creating a training data set from distance-to-default values for a first set of companies; code for building a set of predictive models based on the training data set; and code for forecasting an estimated change in distance-to-default values for a second set of companies according to the set of predictive models.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
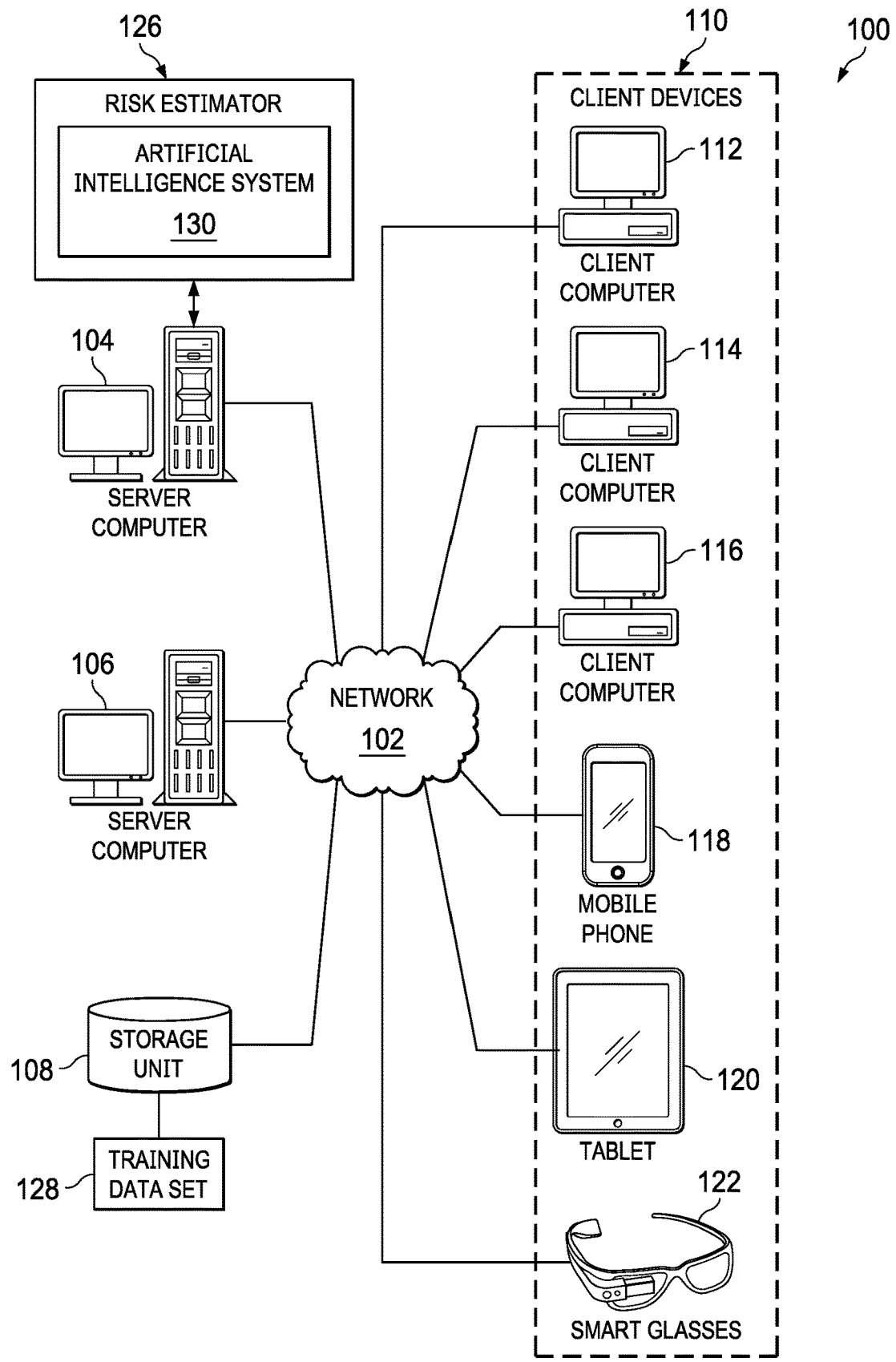
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, risk estimator 126 is located in server computer 104. As depicted, risk estimator 126 operates to generate training data set 128 for training artificial intelligence system 130 to assess a credit risk based on an estimated change in distance-to-default value.

Figure 2:
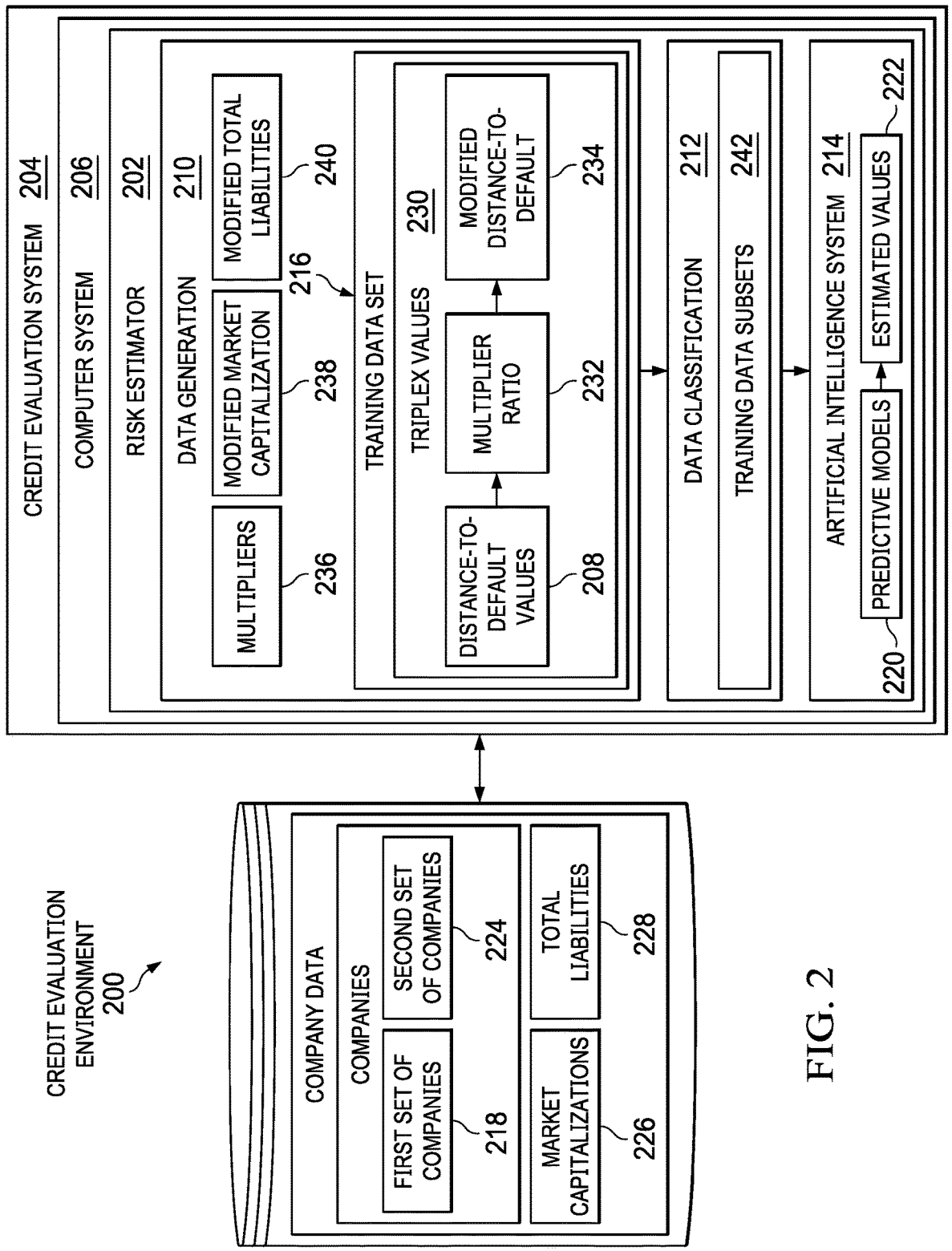
FIG. 2 is a block diagram of a credit evaluation environment depicted in accordance with an illustrative embodiment.

With reference now to FIG. 2, a block diagram of a credit evaluation environment is depicted in accordance with an illustrative embodiment. In this illustrative example, credit evaluation environment 200 includes components that can be implemented in hardware such as the hardware shown in network data processing system 100 in FIG. 1.

As depicted, credit evaluation environment 200 is an environment in which risk estimator 202 manages credit evaluation system 204 in computer system 206 to provide services for assessing a credit risk for a set of companies.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, risk estimator 202 and computer system 206 form credit evaluation system 204. In managing credit evaluation system 204 to provide services, risk estimator 202 can perform estimations of distance-to-default values 208 for use in assessing a credit risk of a set of companies.

Risk estimator 202 can be implemented in software, hardware, firmware, or a combination thereof. When software is used, the operations performed by risk estimator 202 can be implemented in program code configured to run on hardware, such as a processor unit. When firmware is used, the operations performed by risk estimator 202 can be implemented in program code and data and stored in persistent memory to run on a processor unit. When hardware is employed, the hardware may include circuits that operate to perform the operations in risk estimator 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Risk estimator 202 can include a number of different components for assessing a credit risk for a set of companies. As depicted, risk estimator 202 includes data generation 210, data classification 212, and artificial intelligence system 214.

As depicted, risk estimator 202 uses data generation 210 to create a training data set 216 from distance-to-default values 208 for a first set of companies 218. Risk estimator 202 builds a set of predictive models 220 based on the training data set 216. Risk estimator 202 then forecasts estimated values 222 of the distance-to-default for a second set of companies 224 according to the set of predictive models 220.

The predictive models 220 of risk estimator 202 provide a numerical calibration that directly approximates a change to the distance-to-default based on a change in the underlying factors, without the need to compute the change in asset value and asset volatility. Unlike other solutions, risk estimator 202 works for large changes in the underlying factors. Furthermore, because prediction of estimated values 222 for individual companies does not require the computational intensity of other solutions, risk estimator 202 is more efficient determining potential credit risk, enabling faster distance to default determinations, and parallelizable estimation of changes in the distance-to-default for thousands of companies.

The predictive models 220 of risk estimator 202 speed up the estimation of public firms' Merton's distance-to-default under various scenarios, for any initial distance-to-default value. A numerical calibration enables the quick and reasonably accurate estimate of the distance-to-default of thousands of public companies, under various scenarios (e.g., what happens if their market capitalization decreases by 10%, or their total liabilities double), without the need for time-consuming and data-intensive calculations performed at individual company level.

In this illustrative example, risk estimator 202 includes artificial intelligence system 214 that comprises one or more predictive models 220. Artificial intelligence system 214 is a system that has intelligent behavior and can be based on function of the human brain. Artificial intelligence system 214 comprises at least one of an artificial neural network, an artificial neural network with natural language processing, a cognitive system, a Bayesian network, a fuzzy logic, an expert system, a natural language system, a cognitive system, or some other suitable system.

In one illustrative example, machine learning is used to train predictive models 220 of artificial intelligence system 214. Machine learning involves inputting data to the process and allowing the process to adjust and improve the function of the artificial intelligence system. In one illustrative example, artificial intelligence system 214 operates to train one or more of predictive models 220 for use in predicting distance-to-default in a supervised learning process.

During a supervised learning, the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

The set of predictive models 220 is trained from training data set 216, one or more of predictive models 220 are numerically calibrated based the distance-to-default of first set of companies 218. Once trained, predictive models 220 enables risk estimator 202 to provide a quick and accurate estimate of credit risk, under various scenarios, without the need for time-consuming and data-intensive calculations of distance-to-default values 208 performed at individual company level. For example, using predictive models 220, risk estimator 202 can quickly determine what happens to a company's credit risk if the company's market capitalization decreases by 10%, or the company's total liabilities double.

In one illustrative example, risk estimator 202 creates the training data set 216 by identifying market capitalizations 226 and total liabilities 228 for the first set of companies 218. For each of the first set of companies 218, risk estimator 202 determines the distance-to-default values 208 according to the market capitalization 226 and total liabilities of the first set of companies 218.

In one illustrative example, risk estimator 202 uses the Merton model to determine distance-to-default values 208 for first set of companies 218. In the case of the Merton model, where it is assumed that the asset value of the firm follows a geometric Brownian motion process, the distance-to-default values 208 for first set of companies 218 can be determined by:

$$DD_T = \frac{\ln\left(\frac{V_A}{D}\right) + \left(\mu - \frac{1}{2}\sigma_A^2\right)T}{\sigma_A \sqrt{T}} \qquad \text{Eq. 1}$$

Where:
$V_A$ is the market-implied value of the asset;
D is the default point (e.g., total liabilities);
$\mu$ is the asset return;
$\sigma_A$ is the asset volatility; and
T is the time horizon.

Equation (1) simply states that the distance-to-default is the expected difference between the asset value of the firm relative to the default barrier, after correcting and normalizing for the volatility of assets.

The asset volatility $\sigma_A$ is generally unobservable. Instead, asset volatility $\sigma_A$ must be determined indirectly from the observable equity volatility $\sigma_E$. Asset volatility $\sigma_A$ is related to equity volatility $\sigma_E$ by:

$$\sigma_A = \left(\frac{1}{\Delta_E}\right) * \left(\frac{V_E}{V_A}\right) * \sigma_E \qquad \text{Eq. 2}$$

Where:
$V_E$ is the equity value;
$V_A$ is the asset value; and
$\Delta_E$ is a measure of the sensitivity of equity value $V_E$ to the underlying asset value $V_A$ Assuming that a company is publicly traded, the equity volatility $\sigma_E$ of the firm can be calculated from the standard deviation of the firm's stock price returns. Equity volatility $\sigma_E$ is a statistical measure of the dispersion of returns for a given security or market index. Equity volatility $\sigma_E$ affected by a firm's leverage and is not directly interchangeable with asset volatility $\sigma_A$.

The equity value $V_E$ represents a residual claim on the firm's assets beyond the payoff of the debt principal at maturity. As such the equity value $V_E$ can be considered a call option on the firm's assets. If the underlying asset value of the firm follows a stochastic process with constant drift and volatility, then equity value $V_E$ can be priced using the standard formula:

$$V_E = V_A N(d_1) - Ke^{-rT} * N(d_2) \quad \text{Eq. 3}$$

Where:
$d_1 = DD_T$;
$d_2 = d_1 - \sigma_A \sqrt{T}$;
N is the cumulative standard normal distribution;
P is the principal due to the bondholders at maturity;
T is the time to maturity of the bond; and
r is the continuously compounded risk-free interest rate.

Solving from equation 3, asset value can be determined by:

$$V_A = \frac{V_E}{N(d_1)} + Ke^{-rT} * N(d_2) \quad \text{Eq. 4}$$

As can be seen in the above equations, asset value and asset volatility are interdependent. Therefore, calculation of a publicly listed company's distance-to-default via the Merton approach requires a time series of daily stock returns and the iterative solution of two unknowns in a nonlinear system of equations:

$$\begin{cases} f_1(V_E, \sigma_E) = V_A(t)N(d_1) - e^{-rT}DN(d_1) - V_E(t) = 0 \\ f_2(V_E, \sigma_E) = \frac{V_A}{V_E} * N(d_1) * \sigma_E - \sigma_E = 0 \end{cases} \quad \text{Eq. 5}$$

In the illustrative examples, distance to default values 208 for the training data set 216 are calculated via the iterative approach first set of companies 218 on different assessment dates. In this illustrative example, first set of companies 218 are selected randomly such that a wide range of distance-to-default values 208 and interest rate values are covered.

In one illustrative example, risk estimator 202 creates a training data set 216 by generating a set of triplex values 230 for each of the first set of companies 218. In this illustrative example, the training data set 216 comprises the set of triplex values 230. Data generation 210 generates a set of triplex values 230 from a multiplier ratio 232, the distance-to-default values 208 for the first set of companies 218, and modified distance-to-default values 234 for the first set of companies 218.

Multiplier ratio 232 is a ratio of multipliers 236. Each multiplier 236 is a scale factor of the various underlying contributing factors of distance to default values on a different scale. For example, set of multipliers 236 may be applied to market capitalization and total liabilities to generate a modified market capitalization and modified total liabilities.

In one illustrative example, risk estimator 202 identifies a set of multipliers 236 for market capitalizations 226 and total liabilities 228 of the first set of companies 218. Each multiplier ratio 232 is a ratio between one of the multipliers 236 for the market capitalizations 226 of the first set of companies 218 and one of the multipliers 236 for the total liabilities 228 of the first set of companies 218.

In this illustrative example, risk estimator 202 generates a modified market capitalization 238 and modified total liabilities 240 according to the set of multipliers 236. For example, for each of the first set of companies 218, risk estimator 202 scales the market capitalization 226 and total liabilities 228 of all companies by the same multipliers, respectively, and recalculate the actual distance-to-default values 208 based on the modified market capitalization and modified total liabilities. Using the iterative approach as described above, risk estimator 202 determines a set of modified distance-to-default values 234 for each of the first set of companies 218, according to the modified market capitalization and the modified total liabilities.

Risk estimator 202 repeats the determination with different values of multiplier 236 for the market capitalization 226 and total liabilities 228 to obtain a set of triplex values 230. Each of triplex values 230 can be represented as:

$$\left(m = \frac{m_1}{m_2}, DD_0, DD_1\right) \quad \text{Eq. 6}$$

Where:
$m_1$ is the multiplier for market capitalization;
$m_2$ is the multiplier for total liabilities;
$DD_0$ is the original distance-to-default values before applying the multipliers; and
$DD_1$ is the adjusted distance-to-default values after applying the multipliers.

In one illustrative example, risk estimator 202 uses data classification 212 to separate the sets of triplex values 230 into training data subsets 242 as part of building the set of predictive models. In this illustrative example, risk estimator 202 separates the set of triplex values 230 according to their multiplier ratio 232 and their distance-to-default values 208. For example, risk estimator 202 splits the triplex data points into four (4) training data subsets groups:

1. m>1 and $DD_0 \geq 0$;
2. m>1 and $DD_0 < 0$;
3. m≤1 and $DD_0 \geq 0$; and
4. m≤1 and $DD_0 < 0$;

In this example, artificial intelligence system 214 builds different ones of predictive models 220 based on each of the training data subsets 242. For example, artificial intelligence system 214 can fit a parametric function for each training data subsets 242 of triplex values 230.

$$= f(DD_0, m, \vec{\theta}) \quad \text{Eq. 8}$$

Where:
is the estimated distance-to-default value; and
$\vec{\theta}$ is the trainable parameters.

Using the predictive models 220 trained with data set b, risk estimator 202 can forecast estimated values 222 of distance-to-default for the second set of companies 224. In this example, artificial intelligence system 214 uses the set of predictive models 220 to forecast estimated values 222 of distance-to-default for the second set of companies 224 according to market capitalizations 226 and total liabilities 228 of the second set of companies 224.

The predictive models 220 of risk estimator 202 speed up the estimation of public firms' Merton's distance-to-default under various scenarios, for any initial distance-to-default value. Training one or more predictive models 220 with training data set 216 enables risk estimator 202 to perform a quick and reasonably accurate estimate of the distance-to-default of thousands of public companies, under various scenarios, without the need for time-consuming and data-intensive calculations performed at individual company level.

In one illustrative example, one or more technical solutions are present that overcome a technical problem with the large amount of computational resources used in determining Merton's distance-to-default. As a result, one or more technical solutions can provide a technical effect of generating a training data set 216 for training one or more predictive models 220 that can accurately predict distance-to-default values using fewer computational resources as compared to systems that use previous techniques.

Computer system 206 can be configured to perform at least one of the steps, operations, or actions described in the different illustrative examples using software, hardware, firmware, or a combination thereof. As a result, computer system 206 operates as a special purpose computer system in which risk estimator 202 in computer system 206 enables a method for assessing a credit risk of a set of companies. In particular, risk estimator 202 transforms computer system 206 into a special purpose computer system as compared to currently available general computer systems that do not have risk estimator 202.

In the illustrative example, the use of risk estimator 202 in computer system 206 integrates processes into a practical application for assessing a credit risk for a set of companies that increases the performance of computer system 206 in estimating distance-to-default values using predictive models 220 that were trained using training data set 216.

Figure 3:
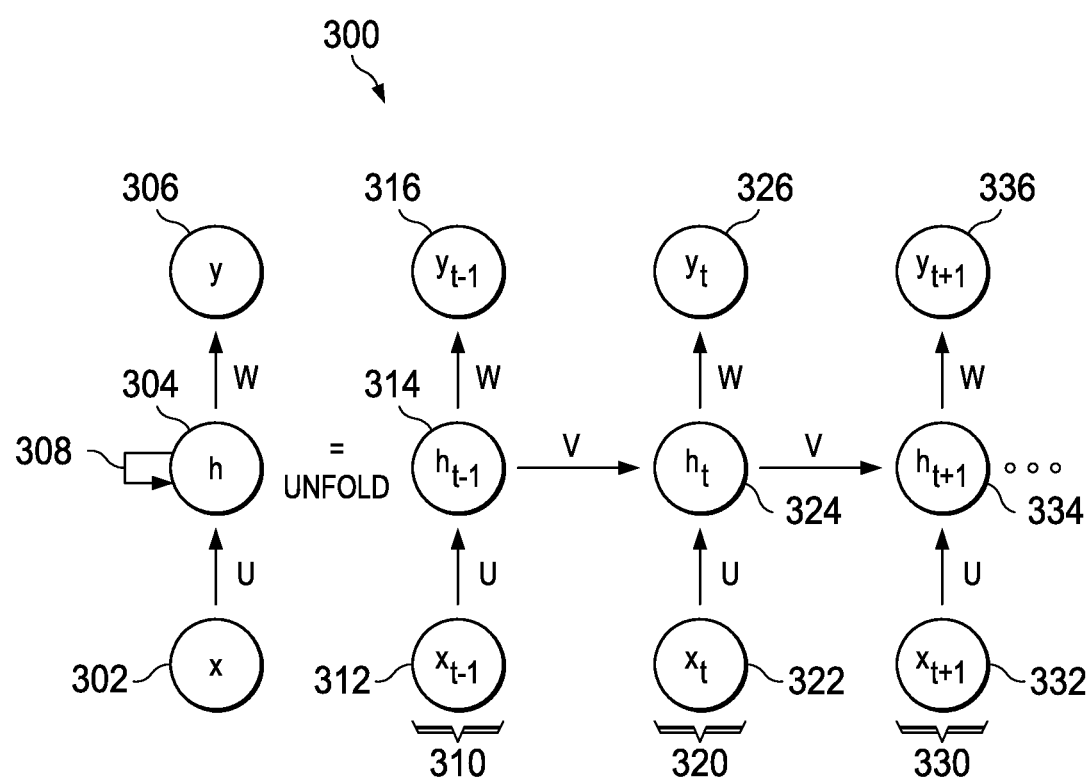
FIG. 3 is an example of a recurrent neural network in which illustrative embodiments can be implemented.

FIG. 3 illustrates an example of a recurrent neural network in which illustrative embodiments can be implemented. RNN 300 might comprise part of artificial intelligence system 214 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 300 comprises an input vector 302, a hidden layer 304, and an output vector 306. RNN 300 also comprises loop 308 that allows information to persist from one input vector to the next. RNN 300 can be "unfolded" (or "unrolled") into a chain of layers, e.g., 310, 320, 330 to write out RNN 300 for a complete sequence. Unlike a traditional neural network, which uses different weights at each layer, RNN 300 shares the same weights U, W across all steps. By providing the same weights and biases to all the layers 310, 320, 330, RNN 300 converts the independent activations into dependent activations.

The input vector 312 at time step t−1 is $x_{t-1}$. The hidden state $h_{t-1}$ 314 at time step t−1, which is required to calculate the first hidden state, is typically initialized to all zeroes. The output vector 316 at time step t−1 is $y_{t-1}$. Because of persistence in the network, at the next time step t, the state $h_t$ 324 of the layer 320 is calculated based on the hidden state $h_{t-1}$ 314 and the new input vector $x_t$ 322. The hidden state acts as the "memory" of the network. Therefore, output $y_t$ 326 at time step t depends on the calculation at time step t−1. Similarly, output vector $y_{t+1}$ 336 at time step t+1 depends on hidden state $h_{t+1}$ 334, calculated from hidden state $h_t$ 324 and input vector $x_{t+1}$ 332.

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e., loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minimum of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural network, the activities of its hidden nodes can be used as input training data for a higher level, thereby allowing stacking of neural networks. Such stacking makes it possible to efficiently train several layers of hidden nodes.

The illustration of credit evaluation environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4A:
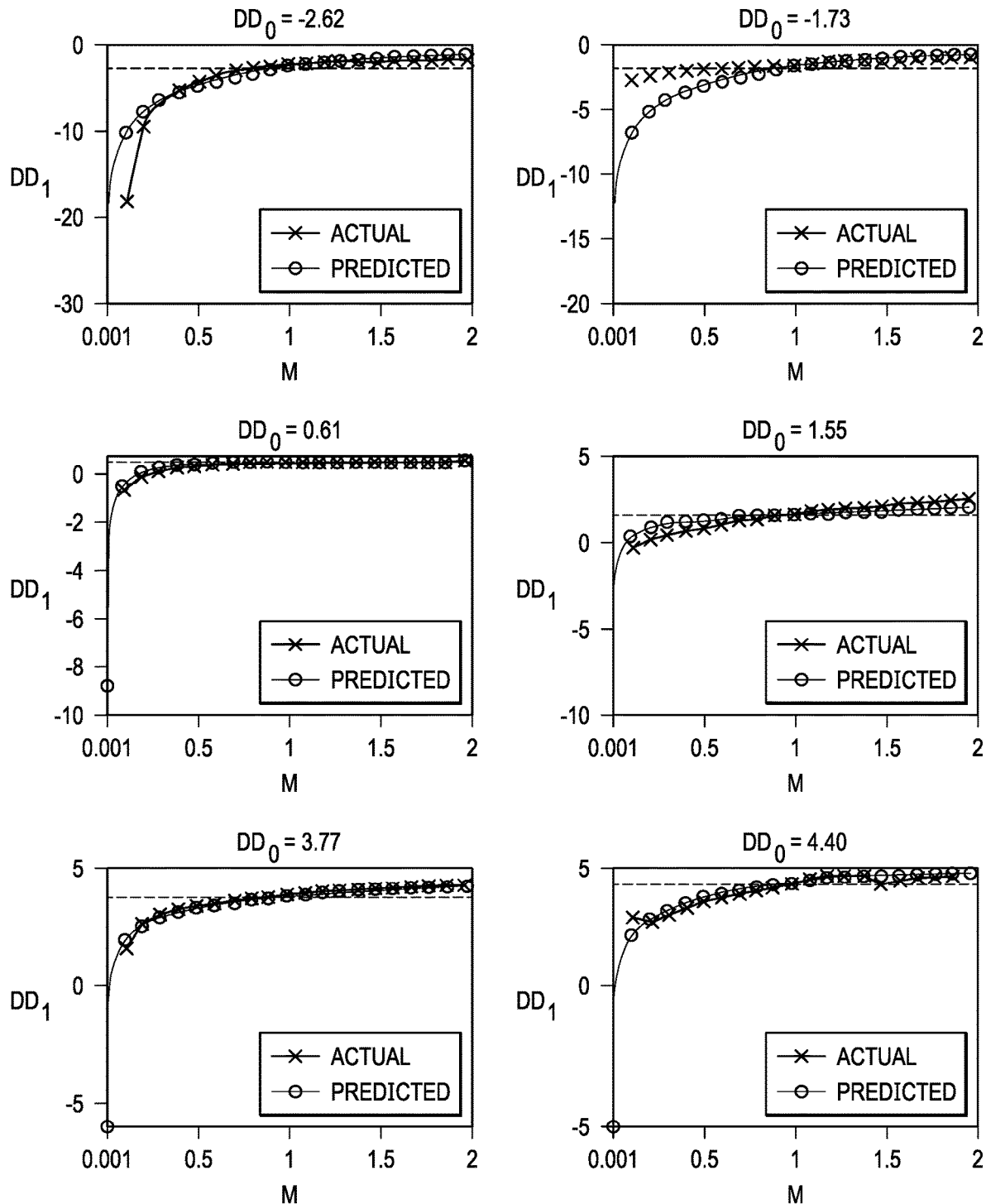
FIGS. 4A-B is a first set of graphs comparing actual distance-to-default values and distance-to-default values estimated under different conditions according to the illustrative embodiments.
Figure 4B:
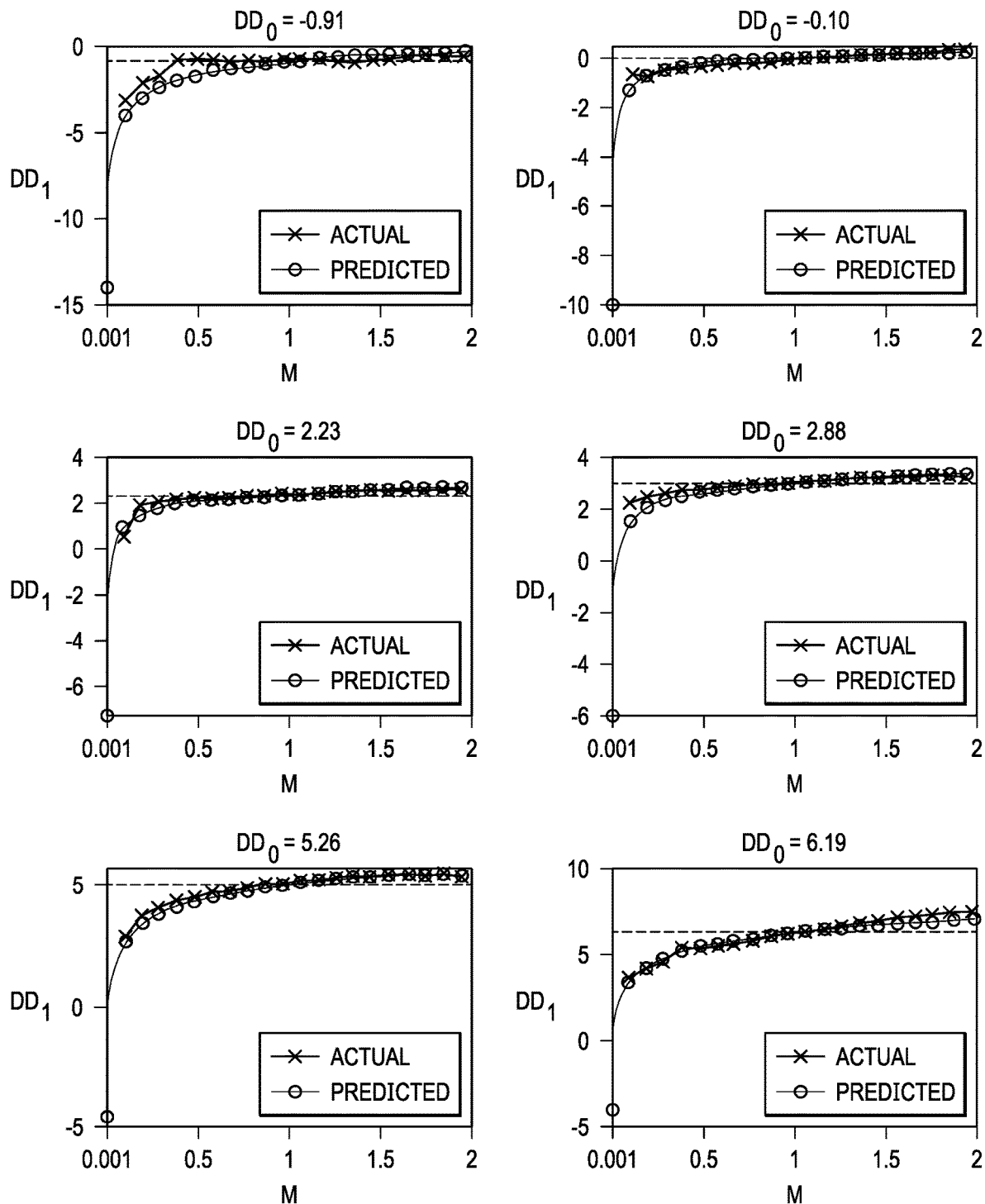
Figure 5A:
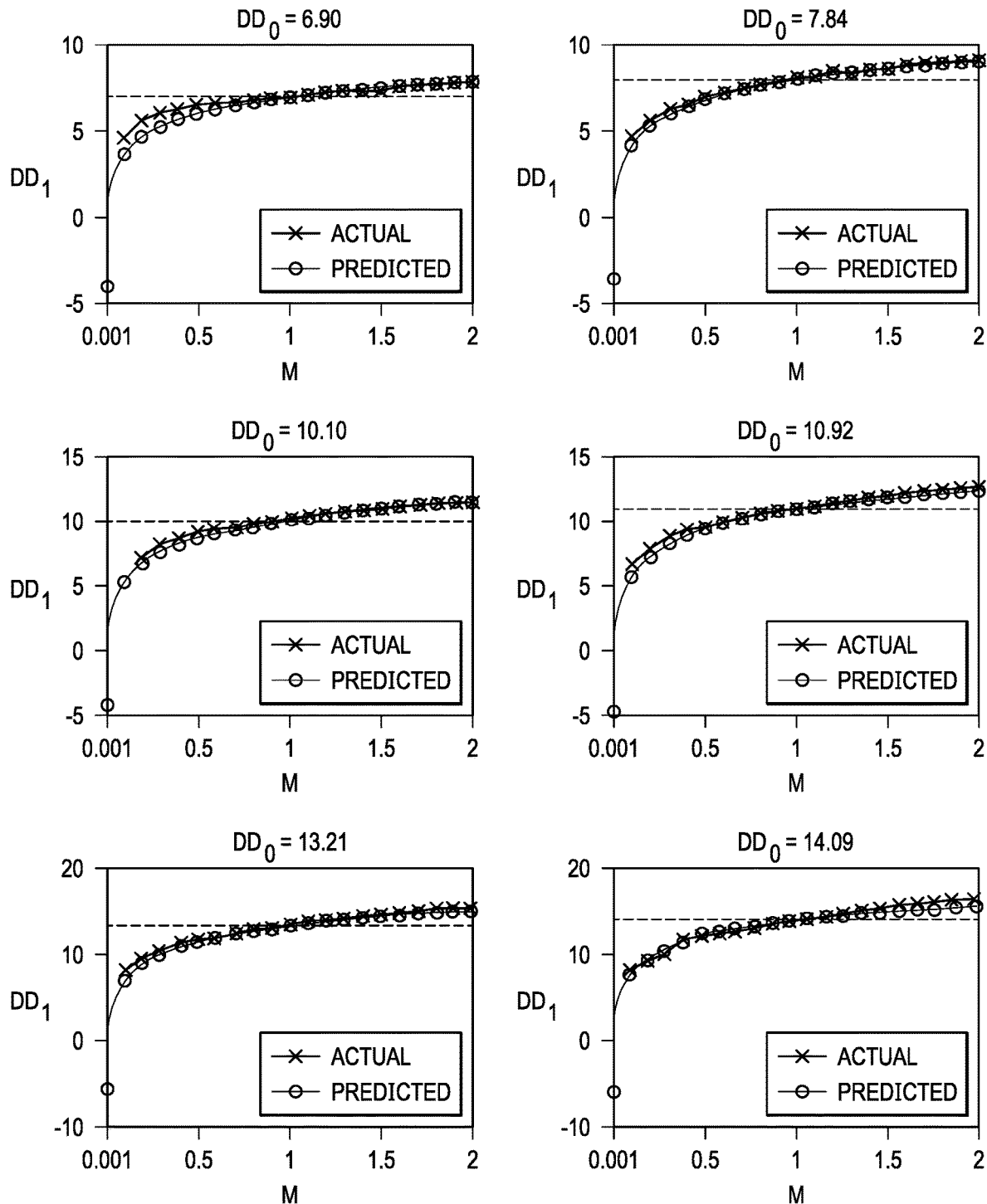
FIGS. 5A-B is a second set of graphs comparing actual distance-to-default values and distance-to-default values estimated under different conditions according to the illustrative embodiments.
Figure 5B:
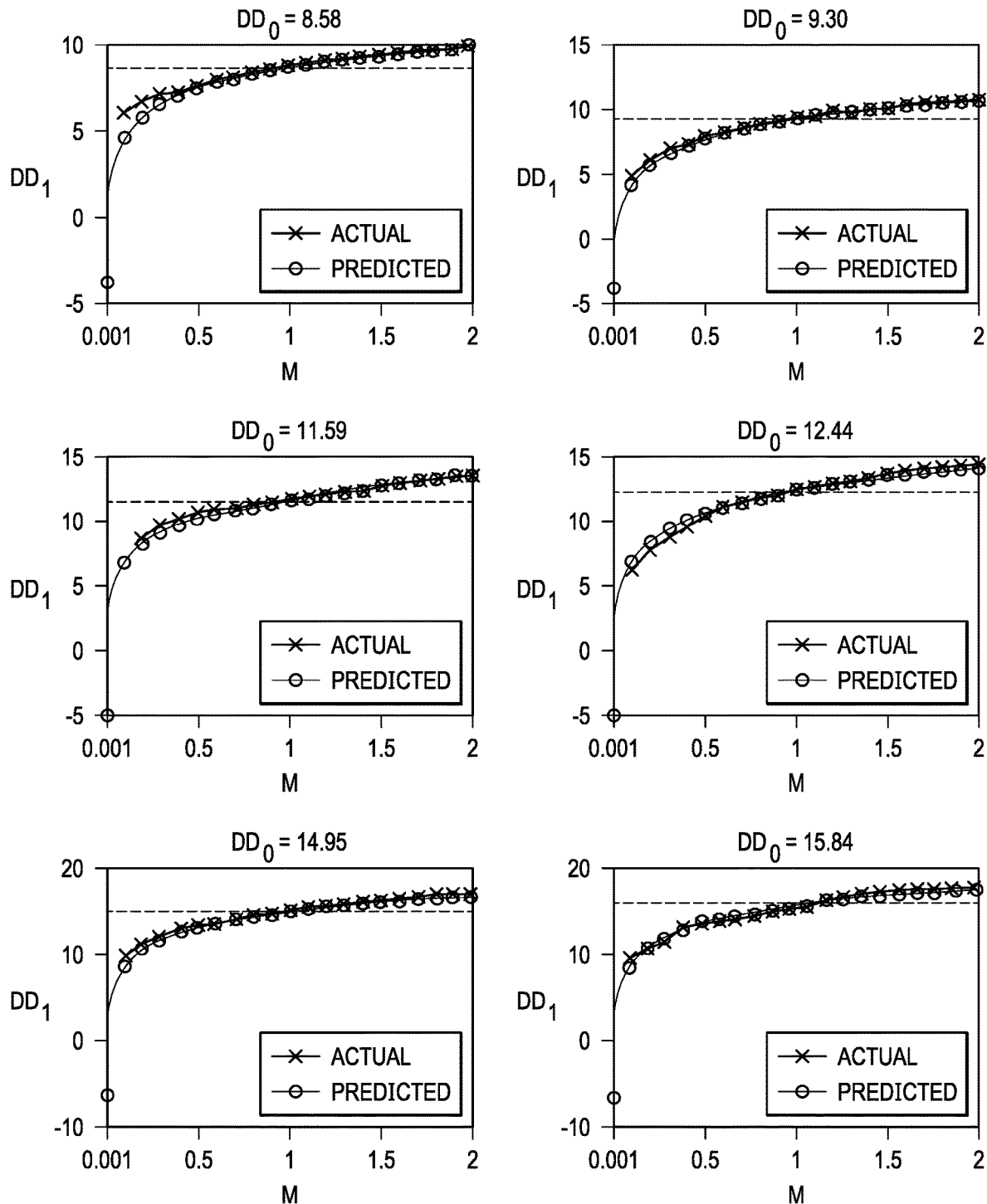
Figure 6A:
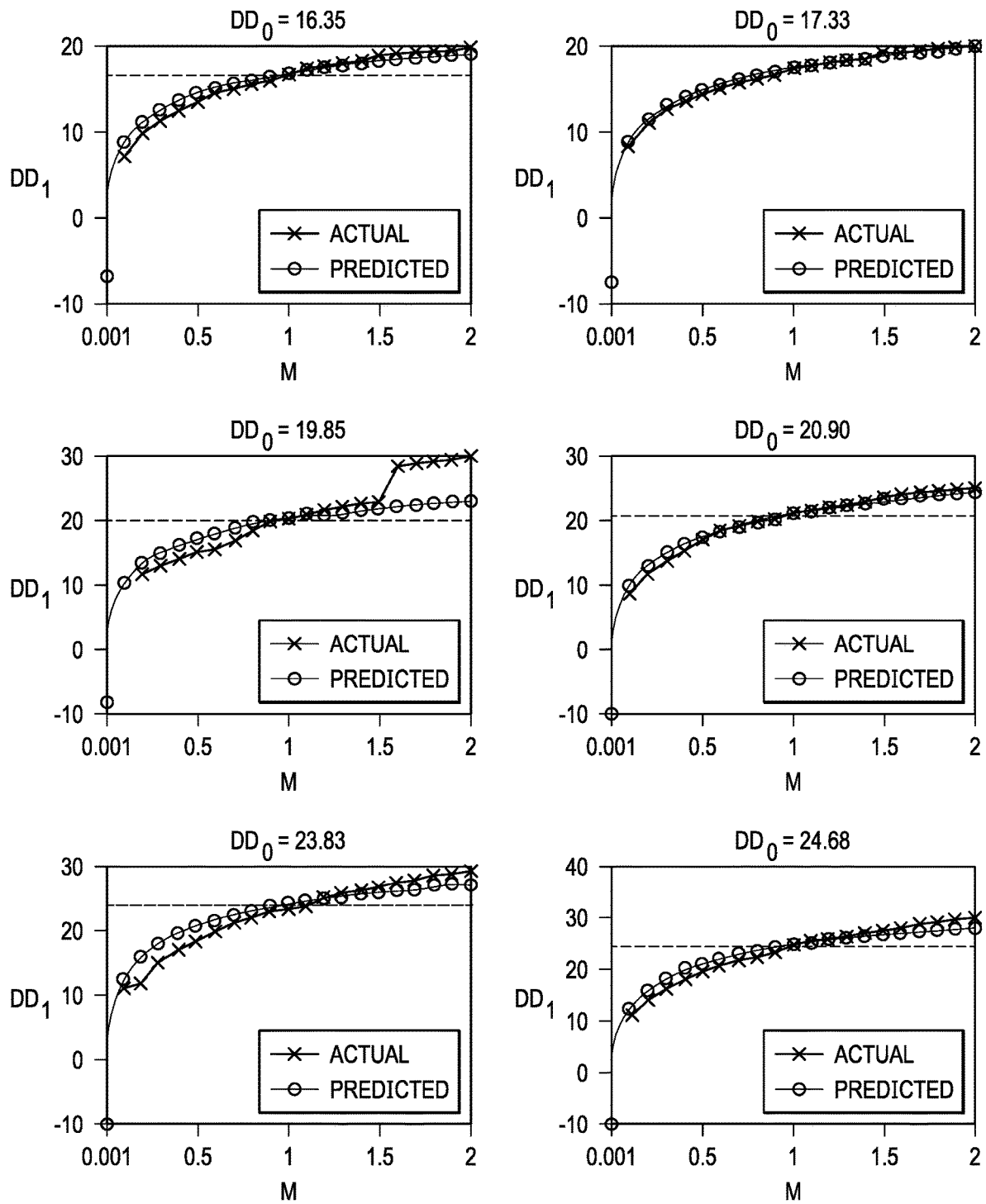
FIGS. 6A-B is a third set of graphs comparing actual distance-to-default values and distance-to-default values estimated under different conditions according to the illustrative embodiments.
Figure 6B:
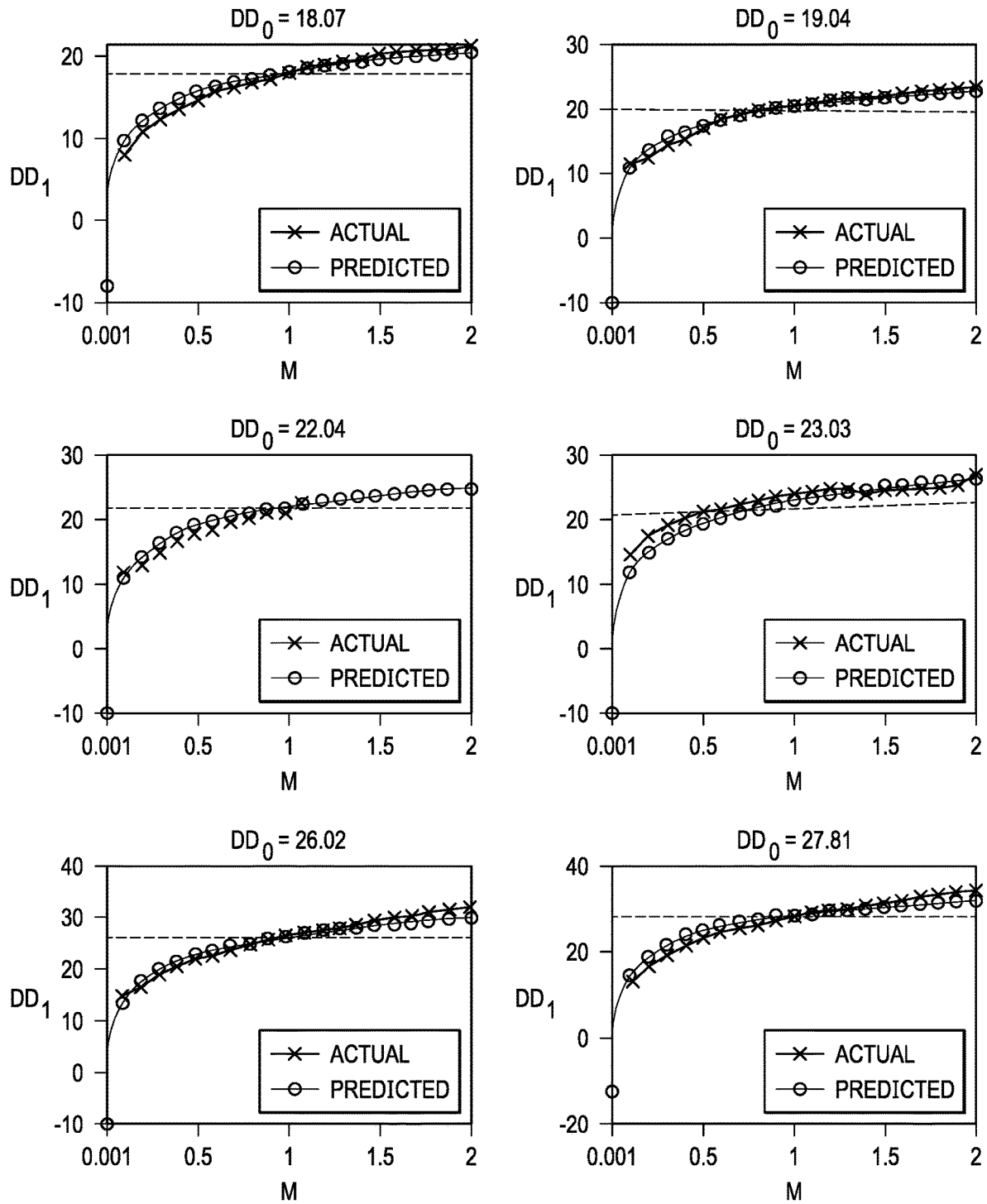

Turning next to FIGS. 4-6, examples of actual $DD_1$ values and the values estimated by parametric functions are illustrated under different values of $DD_0$ and m. The estimated values illustrated in FIGS. 4-6 were predicted using parametric functions generated from a training data set, such as training data set 216 of FIG. 2.

As illustrated by the estimated values of FIGS. 4-6, parametric functions generated from a training data set as described above offer a good approximation of distance-to-default values that links the change in the distance-to-default directly to changes in the underlying factors, including market capitalization and total liabilities. Parametric functions generated from a training data set as described above work for a large change in the underlying factors. Furthermore, parametric functions generated from a training data set as described above, enable fast and parallelizable estimation of the change in the distance-to-default for thousands of companies, without the need to compute the change in asset value and asset volatility.

Figure 7:
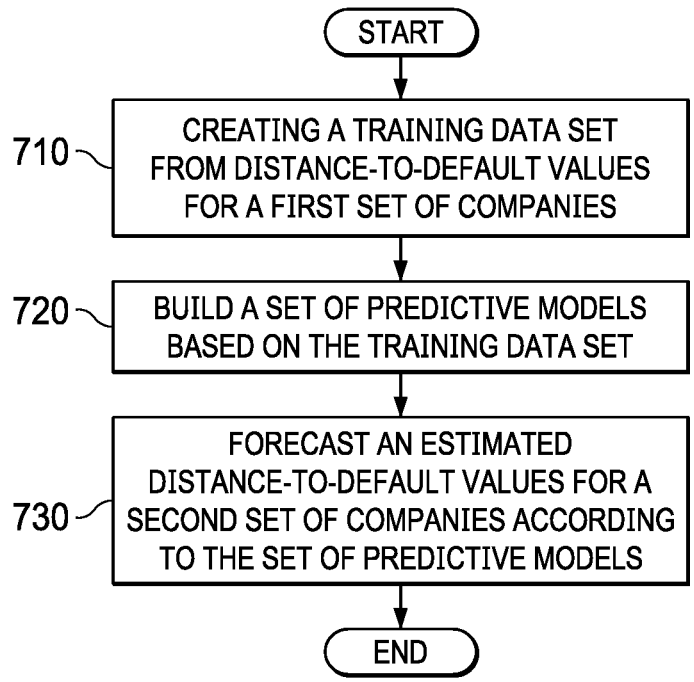
FIG. 7 is a flowchart of a process for assessing a credit risk of a set of companies depicted in accordance with an illustrative embodiment.

Turning next to FIG. 7, a flowchart of a process for assessing a credit risk of a set of companies is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in risk estimator 202 in computer system 206 in FIG. 2.

The process begins by creating a training data set from distance-to-default values for a first set of companies (step 710). The training data set can be training data set 216 of FIG. 2. In one illustrative example, the distance-to-default values for the first set of companies can be determined using the Merton model and an iterative solution of a nonlinear system of equations to determine the asset value $V_A$ and the asset volatility $\sigma_A$.

The process builds a set of predictive models based on the training data set (step 720). The predictive models can be predictive models 220 of FIG. 2.

The process forecasts an estimated change in distance-to-default values for a second set of companies according to the set of predictive models (step 730) and terminates thereafter. In one illustrative example, the estimated change in distance-to-default values for the second set of companies is forecast from the set of predictive models according to market capitalizations and total liabilities of the second set of companies.

Figure 8:
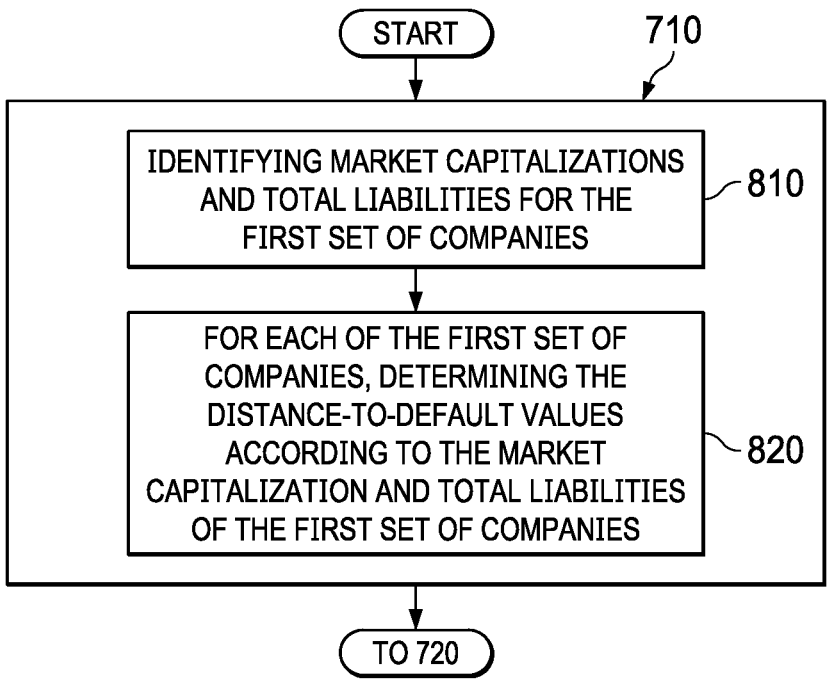
FIG. 8 is a flowchart of a process for creating a training data set from distance-to-default values for a first set of companies depicted in accordance with an illustrative embodiment.

Turning next to FIG. 8, a flowchart of a process for creating a training data set from distance-to-default values for a first set of companies is depicted in accordance with an illustrative embodiment. The process of FIG. 8 is an example of process step 710 of FIG. 7.

As depicted, process step 710 for creating the training data set further comprises identifying market capitalizations and total liabilities for the first set of companies (step 810). For each of the first set of companies, the process determines the distance-to-default values according to the market capitalization and total liabilities of the first set of companies (step 820). Thereafter, the process proceeds to step 720 of FIG. 7.

Figure 9:
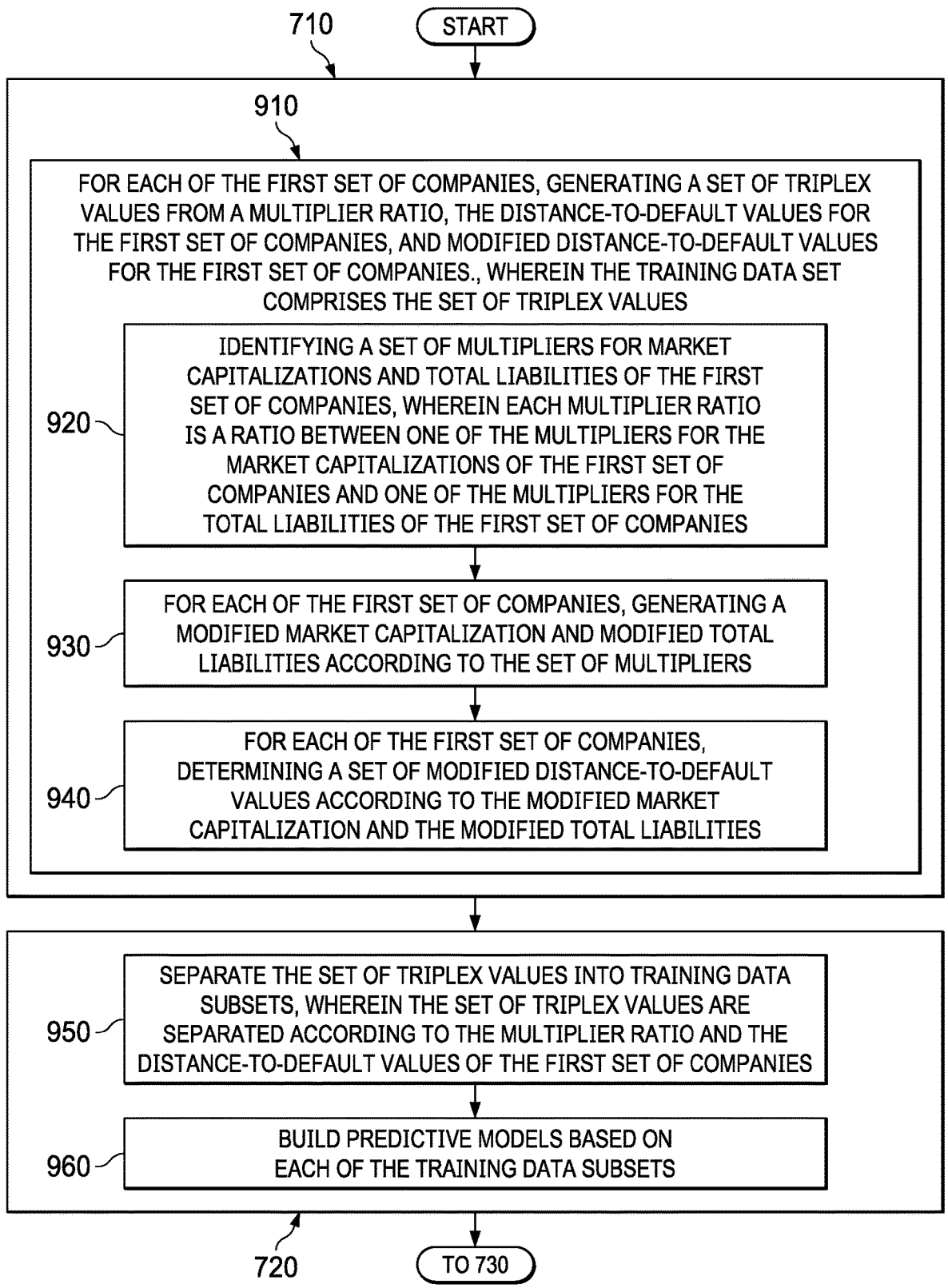
FIG. 9 is a flowchart of a process for creating a training data set and building predictive models is depicted in accordance with an illustrative embodiment.

Turning next to FIG. 9, a flowchart of a process for creating a training data set and building predictive models is depicted in accordance with an illustrative embodiment. The process of FIG. 9 is an example of process steps 710 and 720 of FIG. 7.

In one illustrative example, step 710 for creating the training data set further comprises generating a set of triplex values from a multiplier ratio, the distance-to-default values for the first set of companies, and modified distance-to-default values for the first set of companies, wherein the training data set comprises the set of triplex values (step 910). The set of triplex values can be triplex values 230, shown in block form in FIG. 2.

In one illustrative example, step 910 includes identifying a set of multipliers for market capitalizations and total liabilities of the first set of companies, wherein each multiplier ratio is a ratio between one of the multipliers for the market capitalizations of the first set of companies and one of the multipliers for the total liabilities of the first set of companies (step 920). For each of the first set of companies, the process generates a modified market capitalization and modified total liabilities according to the set of multipliers (step 930). For each of the first set of companies, the process determines a set of modified distance-to-default values according to the modified market capitalization and the modified total liabilities (step 940).

In one illustrative example, step 720 for building the set of predictive models further comprises separating the set of triplex values into training data subsets, wherein the set of triplex values are separated according to the multiplier ratio and the distance-to-default values of the first set of companies (step 950). The process builds predictive models based on each of the training data subsets (step 960). Thereafter, the process proceeds to step 730 of FIG. 7.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
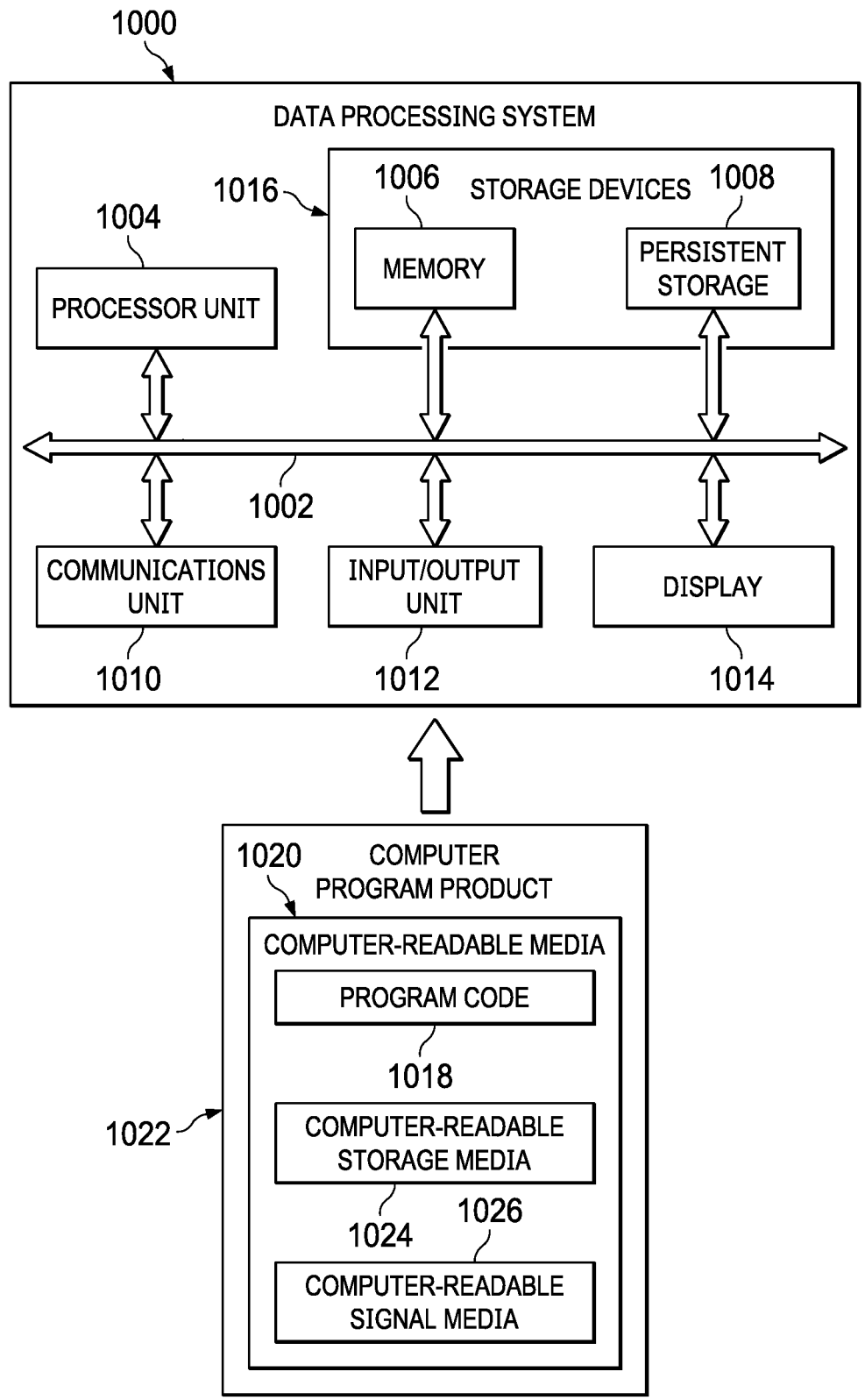
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 206 in FIG. 2.

In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018. The term "non-transitory" or "tangible", as used herein, is a limitation of the medium itself (i.e., tangible, not a signal) as opposed to a limitation on data storage persistency (e.g., RAM vs. ROM).

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments can be implemented. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 1006, or portions thereof, may be incorporated in processor unit 1004 in some illustrative examples.

Thus, illustrative embodiments by method, apparatus, system, and computer program product for [assessing a credit risk of a set of companies. In one illustrative example, a computer system creates a training data set from distance-to-default values for a first set of companies. The computer system builds a set of predictive models based on the training data set. The computer system forecasts an estimated change in distance-to-default values for a second set of companies according to the set of predictive models. This method can be implemented in the illustrative example described for FIG. 2 in which risk estimator 202 operates to train predictive models 220.

The predictive models 220 of risk estimator 202 speed up the estimation of public firms' Merton's distance-to-default under various scenarios, for any initial distance-to-default value. Training one or more predictive models 220 with training data set 216 enables risk estimator 202 to perform a quick and reasonably accurate estimate of the distance-to-default of thousands of public companies, under various scenarios, without the need for time-consuming and data-intensive calculations performed at individual company level.

In one illustrative example, one or more technical solutions are present that overcome a technical problem with the large amount of computational resources used in determining Merton's distance-to-default. As a result, one or more technical solutions can provide a technical effect of generating a training data set 216 for training one or more predictive models 220 that can accurately predict distance-to-default values using fewer computational resources as compared to systems that use previous techniques.

In the illustrative example, the use of risk estimator 202 in a computer system, such as computer system 206 of FIG. 2, integrates processes into a practical application for assessing a credit risk for a set of companies that increases the performance of computer system 206 in estimating distance-to-default values using predictive models 220 that were trained using training data set 216.

A computer system that includes risk estimator 202 be configured to perform at least one of the steps, operations, or actions described in the different illustrative examples using software, hardware, firmware, or a combination thereof. As a result, a computer system that includes risk estimator 202 operates as a special purpose computer system in which risk estimator 202 in computer system 206 enables a method for assessing a credit risk of a set of companies. In particular, risk estimator 202 transforms computer system 206 into a special purpose computer system as compared to currently available general computer systems that do not have risk estimator 202.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method comprising:
creating, by a risk estimator of a computer system, a training data set from distance-to-default values for a first set of companies, wherein the risk estimator comprises an artificial intelligence system;
building, by the risk estimator of the computer system, a set of predictive models based on the training data set, wherein the artificial intelligence system comprises the set of predictive models and machine learning of the artificial intelligence system is used to train the set of predictive models using the training data set;
forecasting, by the risk estimator of the computer system, an estimated change in distance-to-default values for a second set of companies according to the set of predictive models; and
assessing, by the risk estimator of the computer system, a credit risk of the second set of companies according to the estimated change in distance-to-default values,
wherein creating the training data set further comprises:
identifying market capitalizations and total liabilities for the first set of companies; and
for each of the first set of companies, determining the distance-to-default values according to the market capitalization and total liabilities of the first set of companies, and
wherein the distance-to-default values for the first set of companies is determined according to:

$$DD_T = \frac{\ln\left(\frac{V_A}{D}\right) + \left(\mu + \frac{1}{2}\sigma_A^2\right)T}{\sigma_A\sqrt{T}}$$

wherein:
$DD_T$ is a distance-to-default at time T;
$V_A$ is an asset value;
D is total liabilities;
$\mu$ is a mean asset return;
$\sigma_A$ is an asset volatility; and
T is a time horizon,
wherein creating a training data set further comprises:
for each of the first set of companies, generating a set of triplex values from a multiplier ratio, the distance-to-default values for the first set of companies, and modified distance-to-default values for the first set of companies, wherein the training data set comprises the set of triplex values, and
wherein building the set of predictive models further comprises:
separating the set of triplex values into training data subsets, wherein the set of triplex values are separated according to the multiplier ratio and the distance-to-default values of the first set of companies; and
building predictive models based on each of the training data subsets.

2. The method of claim 1, wherein the estimated change in distance-to-default values for the second set of companies is forecast from the set of predictive models according to market capitalizations and total liabilities of the second set of companies.

3. The method of claim 1, wherein the asset value $V_A$ is determined according to:

$$V_A = \frac{V_E + Ke^{-rT} * N(d_2)}{N(d_1)}$$

wherein:
$V_E$ is an equity value;
N is a cumulative standard normal distribution;
$d_1 = DD_T$;
$d_2 = d_1 - \sigma_A\sqrt{T}$;
K is a debt value;
r is a mean asset return; and
T is the time horizon.

4. The method of claim 1, wherein asset volatility $\sigma_A$ is determined according to:

$$\sigma_A = \left(\frac{1}{\Delta_E}\right) * \left(\frac{V_E}{V_A}\right) * \sigma_E$$

wherein:
$V_E$ is an equity value;
$V_A$ is the asset value;
$\sigma_E$ is an equity volatility; and
$\Delta_E$ is a measure of a sensitivity of $V_E$ to $V_A$.

5. The method of claim 1, wherein the asset value $V_A$ and asset volatility $\sigma_A$ are determined from an iterative solution of a nonlinear system of equations.

6. The method of claim 1, wherein creating the training data set further comprises:
identifying a set of multipliers for market capitalizations and total liabilities of the first set of companies, wherein each multiplier ratio is a ratio between one of the set of multipliers for the market capitalizations of the first set of companies and one of the set of multipliers for the total liabilities of the first set of companies;
for each of the first set of companies, generating a modified market capitalization and modified total liabilities according to the set of multipliers; and
for each of the first set of companies, determining a set of modified distance-to-default values according to the modified market capitalization and the modified total liabilities.

7. A credit evaluation system comprising:
a computer system; and
a risk estimator in the computer system, wherein the risk estimator operates to:
create a training data set from distance-to-default values for a first set of companies, wherein the risk estimator comprises an artificial intelligence system;
build a set of predictive models based on the training data set, wherein the artificial intelligence system comprises the set of predictive models and machine learning of the artificial intelligence system is used to train the set of predictive models using the training data set;
forecast an estimated change in distance-to-default values for a second set of companies according to the set of predictive models; and
assess a credit risk of the second set of companies according to the estimated change in distance-to-default values,
wherein creating the training data set further comprises:
identifying market capitalizations and total liabilities for the first set of companies; and
for each of the first set of companies, determining the distance-to-default values according to the market capitalization and total liabilities of the first set of companies, and
wherein the distance-to-default values for the first set of companies is determined according to:

$$DD_T = \frac{\ln\left(\frac{V_A}{D}\right) + \left(\mu + \frac{1}{2}\sigma_A^2\right)T}{\sigma_A\sqrt{T}}$$

wherein:
$DD_T$ is a distance-to-default at time T;
$V_A$ is an asset value;
D is total liabilities;
μ is a mean asset return;
$\sigma_A$ is an asset volatility; and
T is a time horizon,
wherein creating the training data set further comprises:
for each of the first set of companies, generating a set of triplex values from a multiplier ratio, the distance-to-default values for the first set of companies, and modified distance-to-default values for the first set of companies, wherein the training data set comprises the set of triplex values, and
wherein building the set of predictive models further comprises:
separating the set of triplex values into training data subsets, wherein the set of triplex values are separated according to the multiplier ratio and the distance-to-default values of the first set of companies; and
building predictive models based on each of the training data subsets.

8. The credit evaluation system of claim 7, wherein the estimated change in distance-to-default values for the second set of companies is forecast from the set of predictive models according to market capitalizations and total liabilities of the second set of companies.

9. The credit evaluation system of claim 7, wherein the asset value $V_A$ is determined according to:

$$V_A = \frac{V_E + Ke^{-rT} * N(d_2)}{N(d_1)}$$

wherein:
$V_E$ is an equity value;
N is a cumulative standard normal distribution;
$d_1 = DD_T$;
$d_2 = d_1 - \sigma_A\sqrt{T}$;
K is a debt value;
r is the mean asset return; and
T is the time horizon.

10. The credit evaluation system of claim 7, wherein asset volatility QA is determined according to:

$$\sigma_A = \left(\frac{1}{\Delta_E}\right) * \left(\frac{V_E}{V_A}\right) * \sigma_E$$

wherein:
$V_E$ is an equity value;
$V_A$ is the asset value;
$\sigma_E$ is an equity volatility; and
$\Delta_E$ is a measure of a sensitivity of $V_E$ to $V_A$.

11. The credit evaluation system of claim 7, wherein the asset value $V_A$ and asset volatility $\sigma_A$ are determined from an iterative solution of a nonlinear system of equations.

12. The credit evaluation system of claim 7, wherein creating the training data set further comprises:
identifying a set of multipliers for market capitalizations and total liabilities of the first set of companies, wherein each multiplier ratio is a ratio between one of the set of multipliers for the market capitalizations of the first set of companies and one of the set of multipliers for the total liabilities of the first set of companies;
for each of the first set of companies, generating a modified market capitalization and modified total liabilities according to the set of multipliers; and
for each of the first set of companies, determining a set of modified distance-to-default values according to the modified market capitalization and the modified total liabilities.

13. A computer program product comprising:
a non-transitory computer readable storage media;
program code, stored on the computer readable storage media, for creating a training data set from distanceto-default values for a first set of companies, wherein the risk estimator comprises an artificial intelligence system;

program code, stored on the computer readable storage media, for building a set of predictive models based on the training data set, wherein the artificial intelligence system comprises the set of predictive models and machine learning of the artificial intelligence system is used to train the set of predictive models using the training data set; and program code, stored on the computer readable storage media, for forecasting an estimated change in distance-to-default values for a second set of companies according to the set of predictive models; and program code, stored on the computer readable storage media, for assessing a credit risk of the second set of companies according to the estimated change in distance-to-default values, wherein the program code for creating the training data set further comprises:

program code for identifying market capitalizations and total liabilities for the first set of companies; and program code for determining the distance-to-default values according to the market capitalization and total liabilities of the first set of companies, and wherein the distance-to-default values for the first set of companies is determined according to:

$$DD_T = \frac{\ln\left(\frac{V_A}{D}\right) + \left(\mu + \frac{1}{2}\sigma_A^2\right)T}{\sigma_A \sqrt{T}}$$

wherein:
$DD_T$ is a distance-to-default at time T;
$V_A$ is an asset value;
D is total liabilities;
μ is a mean asset return;
$\Delta_A$ is an asset volatility; and
T is a time horizon, wherein creating a training data set further comprises:
program code for generating a set of triplex values from a multiplier ratio, the distance-to-default values for the first set of companies, and modified distance-to-default values for the first set of companies, wherein the training data set comprises the set of triplex values, and wherein building the set of predictive models further comprises:
program code for separating the set of triplex values into training data subsets, wherein the set of triplex values are separated according to the multiplier ratio and the distance-to-default values of the first set of companies; and building predictive models based on each of the training data subsets.

14. The computer program product of claim 13, wherein the estimated change in distance-to-default values for the second set of companies is forecast from the set of predictive models according to market capitalizations and total liabilities of the second set of companies.

15. The computer program product of claim 13, wherein the asset value $V_A$ is determined according to:

$$V_A = \frac{V_E + Ke^{-rT} * N(d_2)}{N(d_1)}$$

wherein:
$V_E$ is an equity value;
N is a cumulative standard normal distribution;
$d_1 = DD_T$;
$d_2 = d_1 - \sigma_A \sqrt{T}$;
K is a debt value;
r is the mean asset return; and
T is the time horizon.

16. The computer program product of claim 13, wherein asset volatility $\sigma_A$ is determined according to:

$$\sigma_A = \left(\frac{1}{\Delta_E}\right) * \left(\frac{V_E}{V_A}\right) * \sigma_E$$

wherein:
$V_E$ is an equity value;
$V_A$ is the asset value;
$\sigma_E$ is an equity volatility; and
$\Delta_E$ is a measure of a sensitivity of $V_E$ to $V_A$.

17. The computer program product of claim 13, wherein the asset value $V_A$ and asset volatility $\sigma_A$ are determined from an iterative solution of a nonlinear system of equations.

18. The computer program product of claim 13, wherein creating the training data set further comprises:
program code for identifying a set of multipliers for market capitalizations and total liabilities of the first set of companies, wherein each multiplier ratio is a ratio between one of the set of multipliers for the market capitalizations of the first set of companies and one of the set of multipliers for the total liabilities of the first set of companies;

program code for generating a modified market capitalization and modified total liabilities according to the set of multipliers; and program code for determining a set of modified distance-to-default values according to the modified market capitalization and the modified total liabilities.

* * * * *